(12) United States Patent
Kataoka et al.

(10) Patent No.: US 7,328,372 B2
(45) Date of Patent: Feb. 5, 2008

(54) PROCESS DATA COLLECTION SYSTEM WHICH REDUCES COMMUNICATION LOAD FOR ACCESSING DATA

(75) Inventors: Norikatsu Kataoka, Musashino (JP); Eiji Katase, Musashino (JP); Shin-ichirou Mine, Musashino (JP); Takafumi Inoue, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 442 days.

(21) Appl. No.: 10/899,113

(22) Filed: Jul. 27, 2004

(65) Prior Publication Data
US 2005/0028024 A1 Feb. 3, 2005

(30) Foreign Application Priority Data
Jul. 29, 2003 (JP) ............................. 2003-281445

(51) Int. Cl.
*G06F 11/00* (2006.01)
(52) U.S. Cl. ........................................................ 714/13
(58) Field of Classification Search ................... 714/13
See application file for complete search history.

(56) References Cited

U.S. PATENT DOCUMENTS 5,960,421 A * 9/1999 Cline et al. .................... 707/2
6,813,587 B2 * 11/2004 McIntyre et al. ............ 702/183
7,065,670 B2 * 6/2006 Gahan et al. .................. 714/4
7,146,230 B2 * 12/2006 Glanzer et al. ................ 700/83
2007/0198724 A1 * 8/2007 Hawkinson et al. ........ 709/226

FOREIGN PATENT DOCUMENTS

JP 2000-278297 10/2000

OTHER PUBLICATIONS

Hecht et al., "OFFTT: A fault Tolerance Middleware Toolkit for Process Monitoring and Control Windows NT Applications", 2000, IEEE.*
Shimanuki et al., "OLE for Process Control (OPC) for New Industrial Automation Systems", 1999, IEEE, pp. 1048-1050.*

* cited by examiner

*Primary Examiner*—Michael Maskulinski
(74) *Attorney, Agent, or Firm*—Westerman, Hattori, Daniels & Adrian, LLP.

(57) ABSTRACT

The present invention provides a process data collection system characterized by the following points:
Two real servers which can access process data are provided. One real server is used as the control server and the other as the standby server. The real control server is set to be accessible to process data. The real standby server stops access to process data and does not collect data that are not used. This minimizes the communication load for accessing process data.

8 Claims, 8 Drawing Sheets

DA groups
requested
by clients

FIG.3B

Common database
registered

Internal DA groups
in a virtual server

FIG.3C

DA groups registered
by other virtual servers

Internal DA groups
in a real server

FIG.7A Real control server

FIG.7B Real standby server

PROCESS DATA COLLECTION SYSTEM WHICH REDUCES COMMUNICATION LOAD FOR ACCESSING DATA

BACKGROUND OF THE INVENTION

1. Field of the Invention

The present invention relates to redundancy for a process data collection system to acquire process data (including alarm data and event data) obtained in a process control system and to provide those data to a client as production control information.

2. Description of the Prior Art

There are conventional systems in which a process data collection system to acquire process data (including alarm data and event data) obtained in a process control system and to provide those data to a client as production control data is made redundant.

Figure 1:
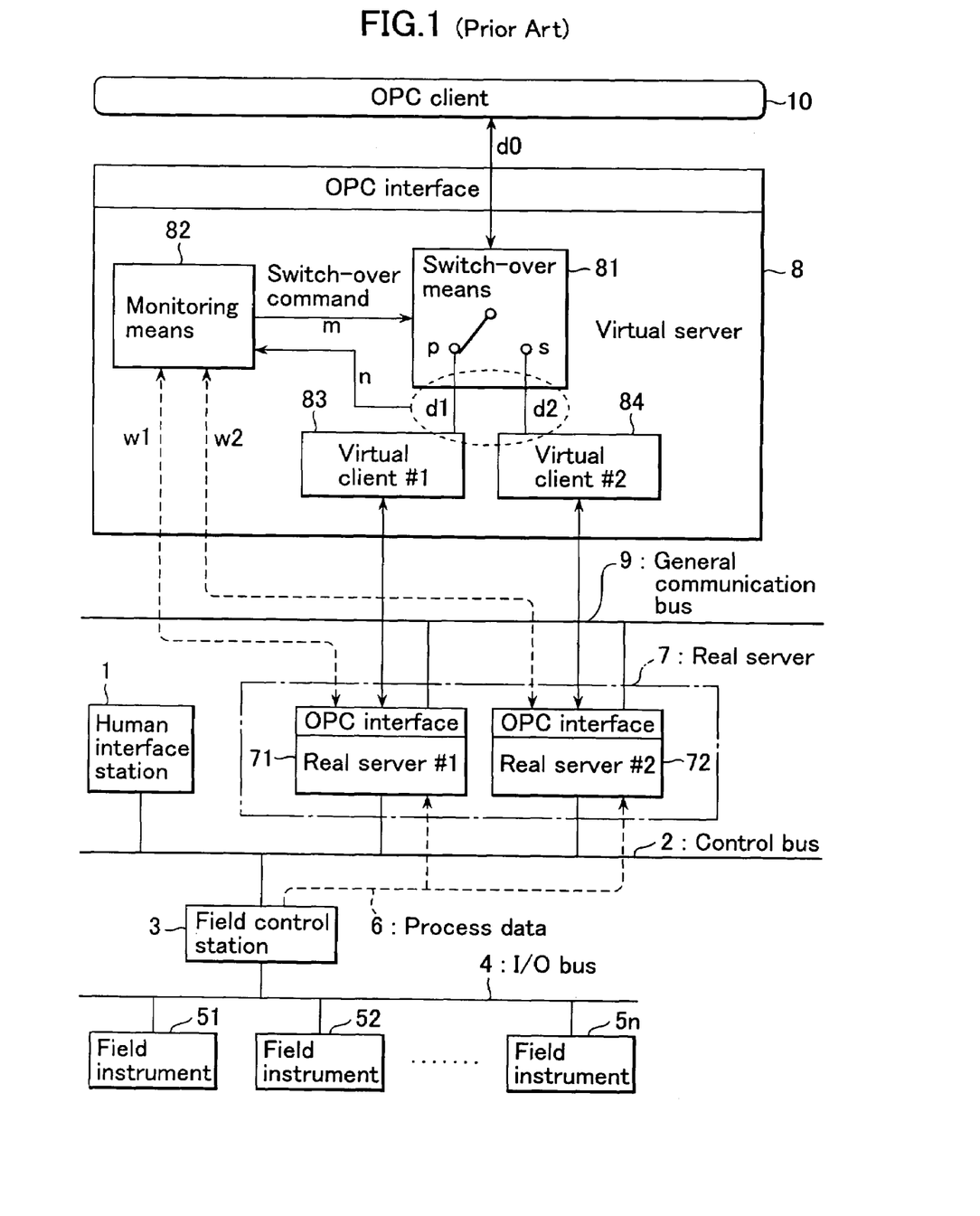
FIG. 1 is a functional block diagram indicating an example of the configuration of conventional redundant process data collection systems.

FIG. 1 is a functional block diagram indicating an example of the configuration of conventional redundant process data collection systems. First, the process control system is a distributed control system having a hierarchical structure, in which upper level human interface station (hereinafter called "HIS") 1 and field control station (hereinafter called "FCS") 3 distributed in plants are connected to control bus 2.

FCS3 is in charge of control for a plurality of field instruments 51, 52, . . . 5n via I/O bus 4 and gives process data (including alarm data and event data) 6 obtained as the result of control to HIS1 via communications. In HIS1, operations and monitoring are performed based on the given data.

Numeral 7 shows a real server connected to control bus 2, which has a function to provide process data 6 from FCS3 to the upper level user (hereinafter called "client") side that utilizes process data as production control information.

Real server 7 is made redundant by real server#1 71 and real server#2 72 to secure reliability in providing information to the client side. Process data 6 are supplied to both real server#1 71 and real server#2 72 in common and thus information simultaneity and equivalency are ensured.

These real server#1 71 and real server#2 72 have interfaces in accordance with OPC (OLE for Process Control) Foundation standards which is made open as the common interface for process data reference (hereinafter called "OPC interface").

Numeral 8 shows a virtual server having an OPC interface, which is connected to real server#1 71 and real server#2 72 via general communication bus 9 represented by Ethernet™. This virtual server 8 intermediates between an upper level client and real server#1 71/real server#2 72 and serves to make the real servers appear to be a single real server when viewed from the client side.

Virtual server 8 has switch-over means 81 and monitoring means 82. Switch-over means 81 is provided with a two-pole toggle switch function, and selects signals from either the primary contact P to which information d1 from real server#1 71 is input via virtual client#1 83 or the secondary contact S to which information d2 from real server#2 72 is input via virtual client#2 84, and notifies OPC client 10 of selecting information d0.

In the normal condition, switch-over means 81 selects the primary contact P, and so real server#1 71 is set as the control server and real server#2 72 is set as the standby server, and process data acquired by real control server#1 71 are given to OPC client 10.

Monitoring means 82 monitors the following abnormalities using diagnosis based on periodical calling and statuses of communication condition and executes switch-over operation which replaces the control server with the standby server by sending a switch-over command m when an abnormality occurs:

(1) Loss of real OPC server function due to a hardware failure or software failure in the real OPC server
(2) Communication error due to a network failure between the virtual server and the real server Symbols "w1" and "w2" indicate diagnostic response data based on periodical calling and symbol "n" indicates the network status confirmation signal.

OPC client 10 consists of a real-time database that holds process data from the real server, received via virtual server 8, in real-time for a prescribed time interval; a historical database where process data from the real-time database are acquired periodically and are processed to long-term trend information; and client applications that call information in those databases and utilize them.

[Patent Document 1]
Gazette for Japanese Laid-open Patent Application No. 2000-278297

Conventional redundant process data collection systems having the above-described configuration have the following problems:

(1) Since even a real server set as the standby server out of two real servers accesses the process data, communication loads for collecting data which are not used normally are generated.
(2) Since all the data items requested by a client are periodically updated evenly, unnecessary duplication due to individual executions of the same data collection takes place and thus the communication load on the control bus increases.
(3) The occurrence of missing process data, caused by a loss of OPC client function due to a hardware failure or software failure and maintenance in the OPC client, cannot be backed up.

SUMMARY OF THE INVENTION

Accordingly, the objective of the present invention which attempts to solve the above-described problems is to realize a process data collection system which minimizes communication loads for accessing process data and can back up the occurrence of missing process data.

BRIEF DESCRIPTION OF DRAWINGS

[FIG. 1]

[FIG. 2]

[FIG. 3]

[FIG. 4]

[FIG. 5]

[FIG. 6]

[FIG. 7]

[FIG. 8]

[FIG. 9]

DESCRIPTION OF THE PREFERRED EMBODIMENTS

Figure 2:
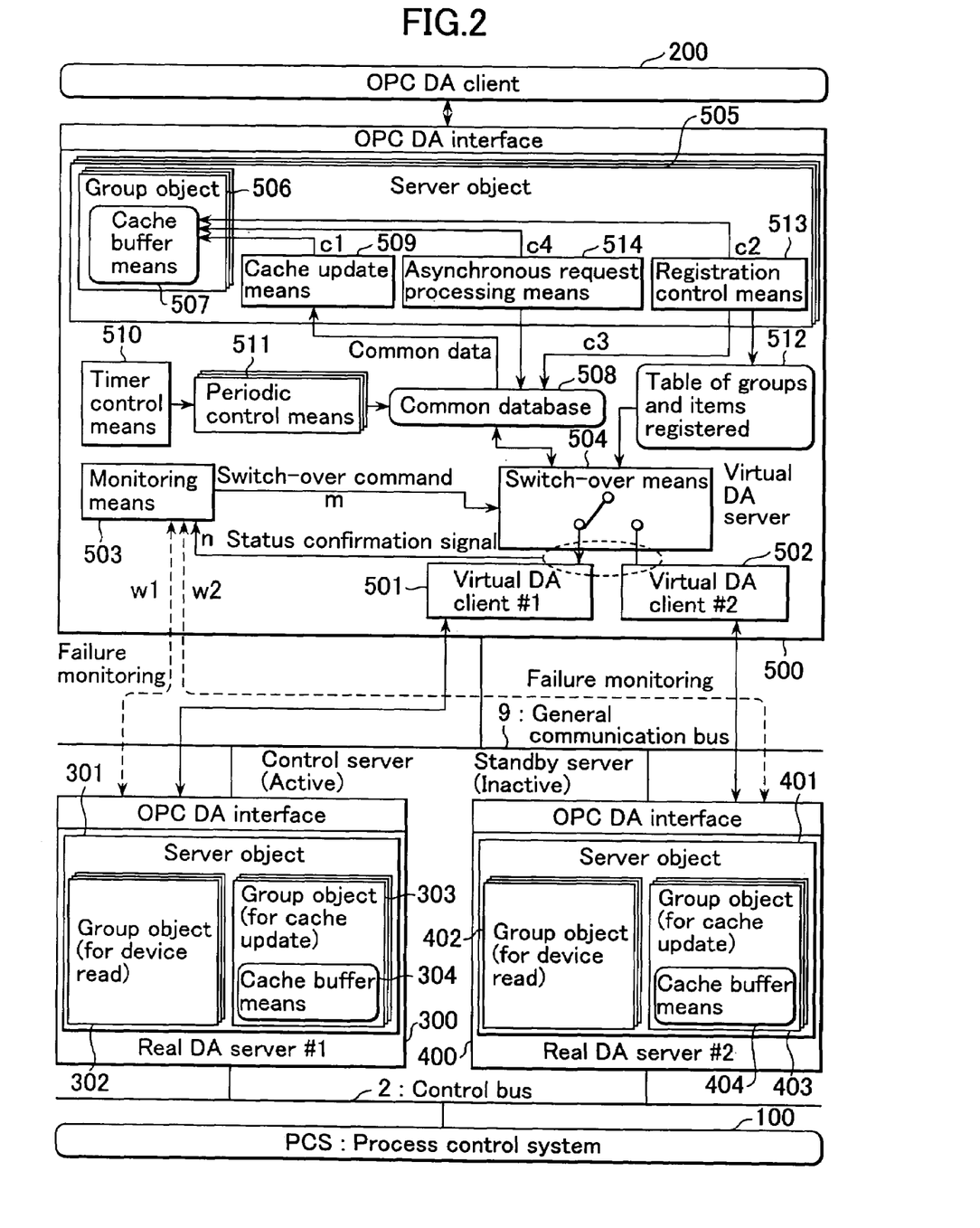
FIG. 2 is a functional block diagram indicating an embodiment of a process data collection system where the present invention is applied to the DA server.

The present invention is described below in detail using drawings. FIG. 2 is a functional block diagram indicating an embodiment of a process data collection system obtained by applying the present invention. The process control system (hereinafter called "PCS") indicated by block 100 is a distributed control system as indicated in the conventional system in FIG. 1. Similarly, the OPC DA client indicated by block 200 is the same as OPC client 10 shown in FIG. 1. Featured parts of the present invention will be described below.

FIG. 2 indicates a process data collection system that is the essential function of the present invention. Each of its elements has symbol DA (Data Access) added to identify them with functions of collecting alarm data and event data and historical data to be described later.

In FIG. 2, numeral 300 denotes real DA server#1 and numeral 400 denotes real DA server#2. These two real servers are set to be accessible to process data in PCS 100 in common and, in a normal operating environment, real DA server#1 300 is selected as the control server and real DA server#2 400 is selected as the standby server.

Real control DA server#1 300 is set to the active state, accesses process data, and acquires data requested by the client, while real standby DA server#2 400 is set to the inactive state and its access to process data is stopped. In the active state, data are acquired periodically, and in the inactive state, data are not acquired.

Numeral 500 denotes a virtual DA server which monitors for failures of the two real servers and network interference to control switch-over and also has a relaying function to give process data acquired by the real control server to OPC DA client 200.

In virtual DA server 500, numeral 501 denotes virtual DA client#1 which communicates with real DA server#1 300, and numeral 502 denotes virtual DA client#2 which communicates with real DA server#2 400.

Numeral 503 denotes a periodical monitoring means which monitors real DA server#1 300 and real DA server#2 400, receives diagnostic response data w1 and w2 based on a periodic calling and status confirmation signal n of the network as inputs, generates switch-over command m in the case of failure of the real control server or network interference, and switches over the control server and standby server in the two real servers by operating switch-over means 504.

Switch-over means 504 has a toggle switch function and gives process data from virtual DA client#1 501 or virtual DA client#2 502 to OPC DA client 200 after selective switching-over. Switch-over means 504 selects the data from virtual DA client#1 501 interfacing with real control DA server#1 300 in a normal operating environment.

Next, a procedure when a plurality of clients reads the process data will be described. FIG. 3 is a group control diagram for real object data, in which the contents of: (A) control for DA groups requested by clients, (B) control for internal DA groups in a virtual server, and (C) control for internal DA groups in two real servers, are indicated.

Figure 3A:
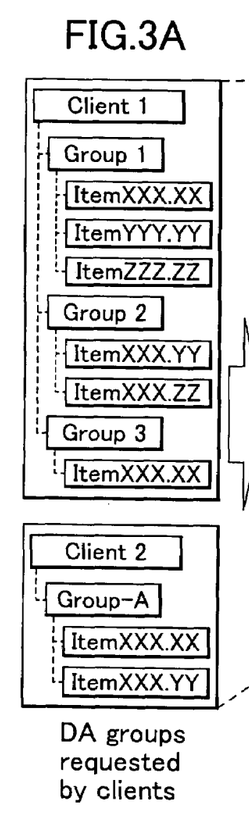
FIG. 3 is a group control diagram for real object data.

In clients 1 and 2 indicated in (A) of FIG. 3, Group1, Group2, Group3 and Group-A are each different data collection period groups, and data items specifying their data collecting periods are registered in each corresponding group respectively. Even if the data item is the same, if data collection is performed in different periods, the data items are registered over a plurality of groups.

Figure 3B:
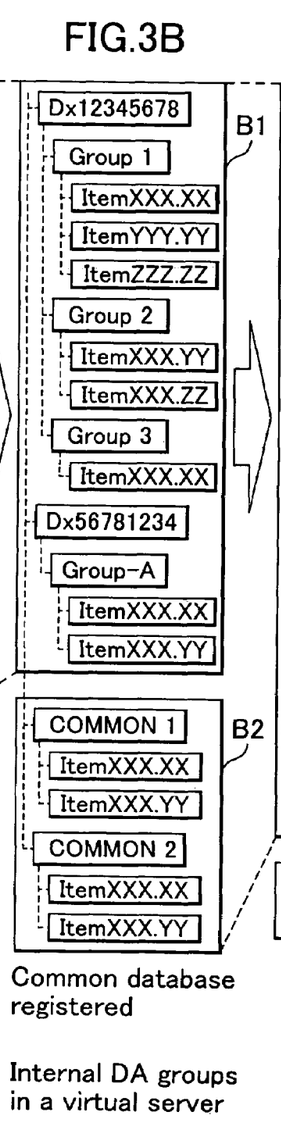

In (B) of FIG. 3, control for DA groups in a virtual server is carried out by dividing them into group control area B1, in which each DA client group shown in (A) is integrated, and common database registration area B2 having groups COMMON1 and COMMON2 in which data items specified for periodical updating in each group are collected and registered.

Figure 3C:
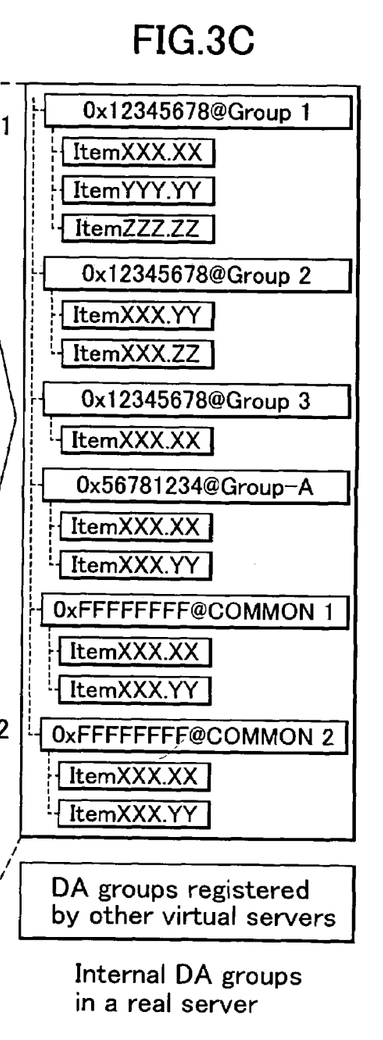

In (C) of FIG. 3, control for DA groups in a real DA server is carried out by integrating areas B1 and B2 shown in (B) and controlling groups COMMON1 and COMMON2 in common database registration area B2 in the identical group.

In FIG. 2, numeral 505 denotes server objects formed in virtual DA server 500 corresponding to a plurality of DA clients, and numeral 506 denotes group objects formed for each server object in which each group in area B1 in (B) of FIG. 3 is registered. Numeral 507 denotes cache buffer means formed in group objects 506 and executes caching of data items specified for periodic updating in groups COMMON1 and COMMON2 in common database registration area B2.

Numeral 508 denotes a common database which periodically acquires and holds data items specified for periodical updating in groups COMMON1 and COMMON2 in common database registration area B2. Held common data generate signal c1 via cache update means 509 formed in server object 505 and cache buffer means 507 is updated by this signal c1.

Numeral 510 denotes the timer control means, and numeral 511 denotes the periodic control means which receives timing information from the timer control means as its input and controls periodical data collections for each DA client. Numeral 512 denotes the table of groups and items registered, which is updated via registration control means 513 formed in server object 505 based on group information (FIG. 3 (A)) prepared by a user in DA clients. The contents of cache buffer means 507 are also updated by means of signal c2 from registration control means 513 and the notification of deleting data item registration is executed to common database 508 using signal c3.

Numeral 514 denotes the asynchronous request processing means for data items that are periodic updating objects, which requests asynchronous data collection to the common database by receiving interrupt requests from DA clients. In addition, item registration/deletion, cache updating, and cache reading in cache buffer means 507 are executed using signal c4.

The contents of the table of groups and items registered 512 are downloaded to two real servers via switch-over means 504 and form group objects indicated in FIG. 3 (C) in each real server.

In real DA server#1 300, numeral 301 denotes one server object formed by downloading of table 512 and numeral 302 denotes a plurality of group objects formed on this server object to which groups other than periodic collection objects (Group1, Group2, Group3 and Group-A) are reflected out of the group control contents shown in FIG. 3 (C).

Numeral 303 denotes group objects for cache updating, to which periodic collection object groups (COMMON1, COMMON2) are reflected out of the group control contents shown in FIG. 3 (C) Numeral 304 denotes the cachebuffer means formed on these group objects.

Similarly, in real DA server#2 400, numeral 401 denotes one server object formed by downloading of table 512 and numeral 402 denotes a plurality of group objects formed on this server object to which groups other than periodic collection objects (Group1, Group2, Group3 and Group-A) are reflected out of the group control contents shown in FIG. 3 (C).

Numeral 403 denotes group objects for cache updating, to which periodic collection object groups (COMMON1, COMMON2) are reflected out of the group control contents shown in FIG. 3 (C) Numeral 404 denotes the cache buffer means formed on these group objects.

As described above, the contents of group objects in two real DA servers are updated by table 512 located in the virtual DA server so that both of these contents always agree with each other, and thus equivalency is ensured even if switch-over is carried out.

In a normal operating environment, although real control DA server#1 300 is set active and real standby DA server#2 400 is set inactive, group objects 302 and 402 in both servers are both set inactive normally and used only for device reading requests from the client.

In a normal operating environment, group object 303 used for cache updating in the control server is set active and acquires process data based on periodic commands from the virtual server and updates the cache buffer means. These updated data are given to the common database in the virtual server and these common data update data in cache buffer means 507 in the virtual DA server via cache update means 509.

The real DA server and the virtual DA server, which become the core of process data collection, have been described above. Hereinafter, an embodiment in which the A&E server and the HDA server are provided in the real server will be described using FIG. 4 through FIG. 7; the A&E server accesses alarm data and event data; and the HDA server receives the data in the DA server and the data in the A&E server as inputs and accumulates them in the historical database for a predetermined period of time.

Figure 4:
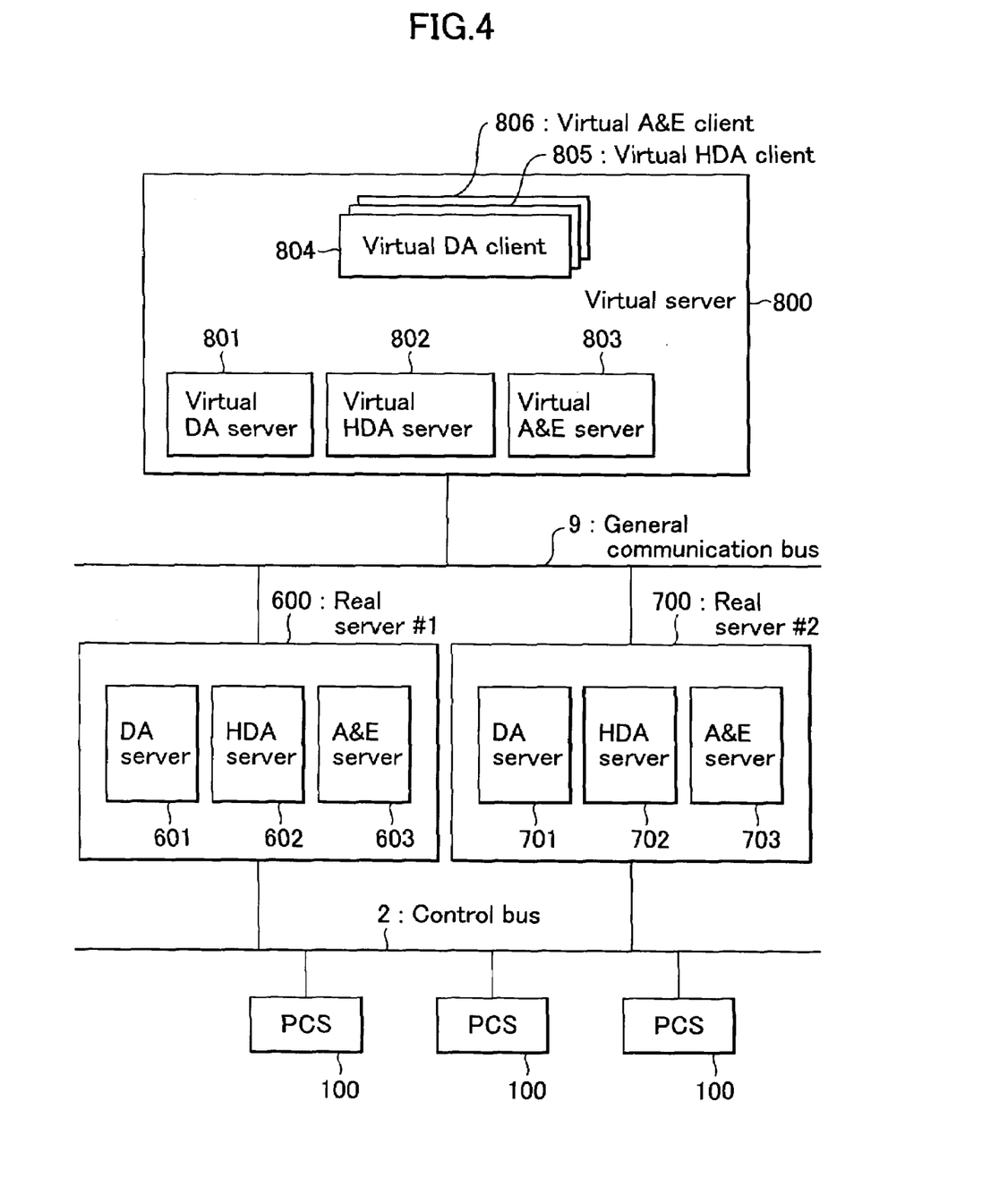
FIG. 4 is a functional block diagram indicating the whole configuration including A&E servers and HDA servers added to DA servers.

FIG. 4 is a functional block diagram indicating the whole configuration including A&E servers and HDA servers. Numeral 600 denotes real server#1, numeral 700 real server#2, and numeral 800 a virtual server. Although not shown in the diagram, these servers both conform to the OPC interface illustrated in FIG. 2.

In real server#1 600, numeral 601 denotes the DA server and corresponds to numeral 300 in FIG. 2. Numeral 602 denotes the HDA server which accumulates data in the historical database (not shown). Numeral 603 denotes the A&E server which accesses alarm data and event data.

Similarly, in real server#2 700, numeral 701 denotes the DA server and corresponds to numeral 400 in FIG. 2. Numeral 702 denotes the HDA server which accumulates data in the historical database (not shown). Numeral 703 denotes the A&E server which accesses alarm data and event data.

In virtual server 800, numeral 801 denotes the virtual DA server and corresponds to numeral 500 in FIG. 2. Numeral 802 denotes the virtual HDA server and numeral 803 the virtual A&E server. Virtual DA client 804, virtual HDA client 805, and virtual A&E client 806 exist corresponding to the above virtual servers.

Virtual HDA client 805 and virtual A&E client 806 are each composed of virtual client#1 and virtual client#2 that communicate with corresponding servers in real server#1 600 and real server#2 700, similar to the virtual DA client in FIG. 2, and data are given to upper level clients selectively by the switch-over means.

As described above, each virtual server has a switch-over means which executes switch-over between the control server and the standby server and specifically, switch-over control for virtual HDA servers must be regulated by the operating status of other virtual servers.

Figure 5:
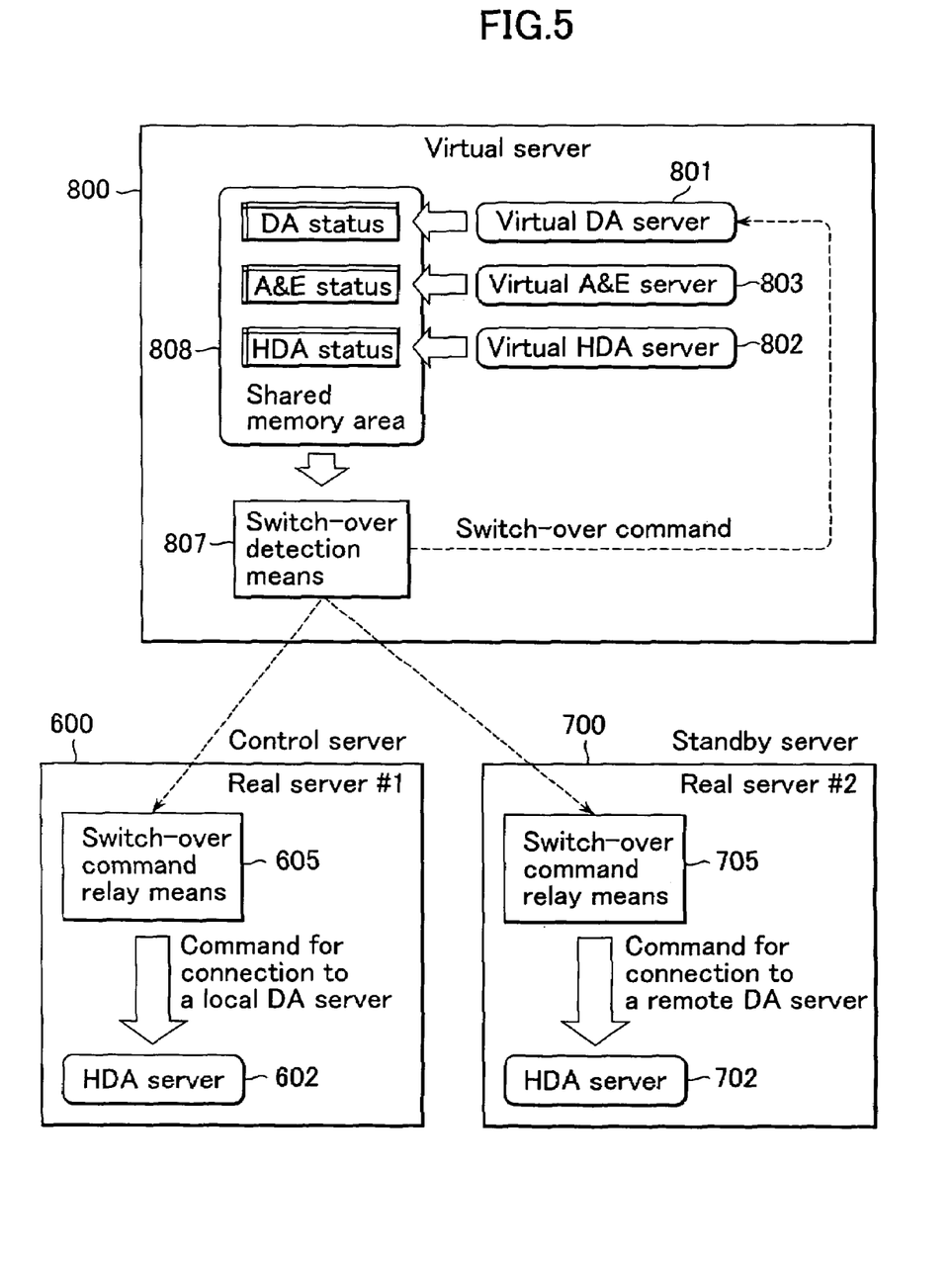
FIG. 5 is a functional block diagram illustrating the switch-over detection means provided in a virtual server.

Now, using the functional block diagram of FIG. 5, the function of switch-over detection means 807 provided in virtual server 800 will be described. Numeral 808 denotes the shared memory area also provided in virtual server 800 and the (operating) statuses of virtual DA server 801, virtual HDA server 802 and virtual A&E server 803 are reflected to this shared memory area.

Switch-over detection means 807 issues the instruction for switching over the control server/standby server to virtual DA server 801 based on these (operating) statuses as well as issues a command to switch-over command relay means 605 in real control server#1 600 and also issues a command to switch-over command relay means 705 in real standby server#2 700. In real control server#1 600, HDA server 602 commands connection to local control DA server 601 and in real standby server#2 700, HDA server 702 commands connection to remote control DA server 601.

Figure 6:
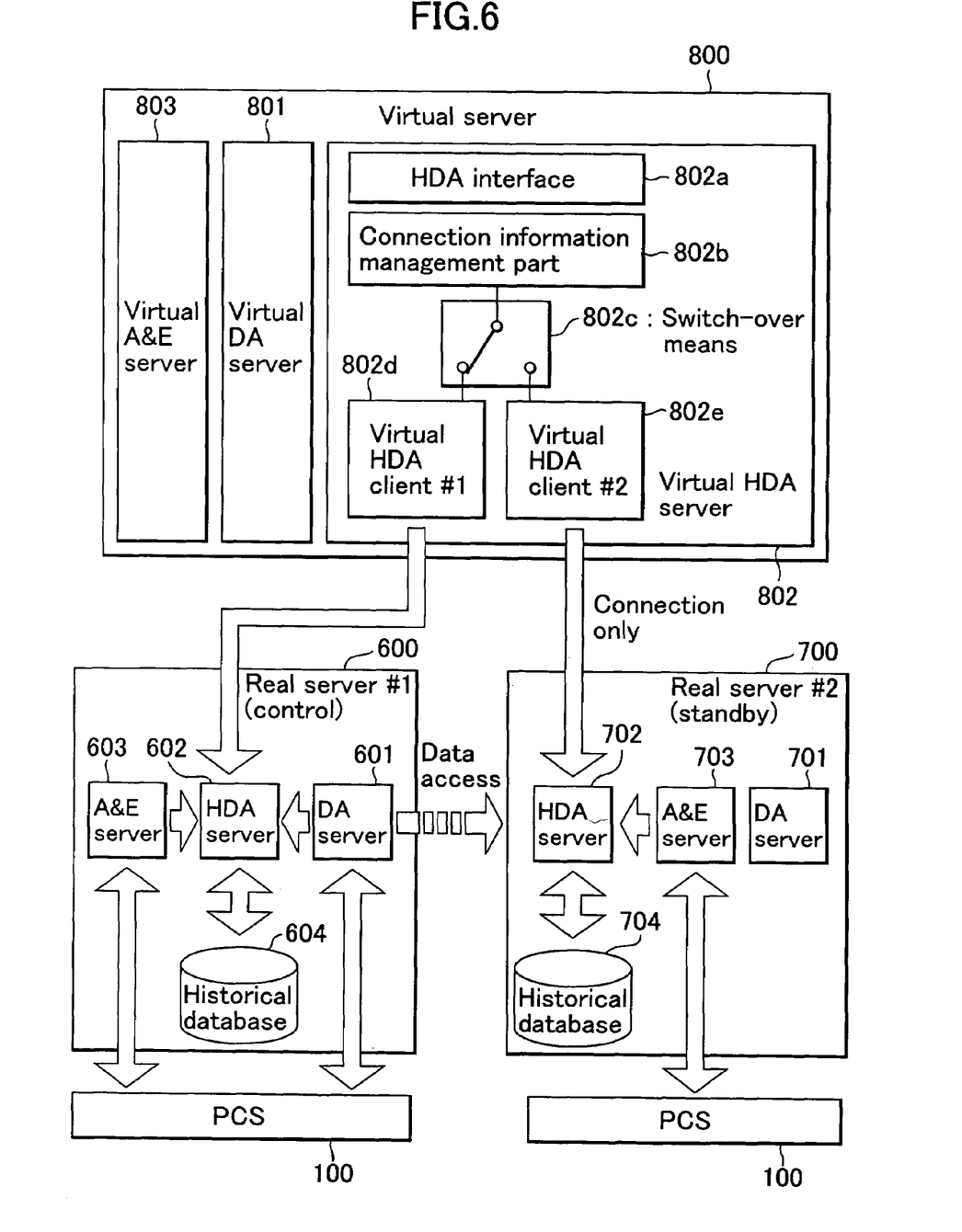
FIG. 6 is a functional block diagram indicating interconnections between the virtual HDA server and each of DA servers, HDA servers and A&E servers in two real servers.

FIG. 6 is a functional block diagram indicating interconnections between virtual HDA server 802 showing such connection command results and each DA server, HDA server and A&E server in two real servers 600 and 700.

In virtual HDA server 802, numeral 802a denotes the HDA interface, numeral 802b denotes the connection information management part, numeral 802c the switch-over means, numeral 802d virtual HDA client#1, and numeral 802e virtual HDA client#2. Although virtual HDA client#1 802d acquires data by communicating with the HDA server in real server#1 600, virtual HDA client#2 802e is only connected to the HDA server in real server#2 700.

In real control server#1 600, DA server 601 and A&E server 603 access PCS100, acquire process data and alarm/event data, write them into HDA server 602, and accumulate them in historical database 604.

In real standby server#2 700, A&E server 703 accesses PCS100, acquires alarm data and event data, writes them into HDA server 702 and accumulates them in historical database 704. However, DA server 701 is always forced to stop any access to PCS100.

In this state, HDA server 702 in the standby server obtains process data in real-time from the DA server in the control server and accumulates them in historical database 704.

As described above, if two real servers in a system of the present invention are normal, data collection and accumulation are performed in both the control server and the standby server. However, the HDA server in the real control server accumulates the data obtained from the DA server and A&E server in their own real server, while the HDA server in the real standby server accumulates the data by obtaining them from the DA server in the control server and A&E server in its own real server.

Through such a configuration, the load of the control bus for the DA server accessing PCS is reduced to the amount for only one control server. For A&E servers, the configuration is such that both access PCS, and the bus load does not change even if information is sent to a plurality of servers because alarm data and event data are broadcast on the control bus. Therefore, in such a configuration data are always respectively obtained from their own server.

Figures 7A, 7B:
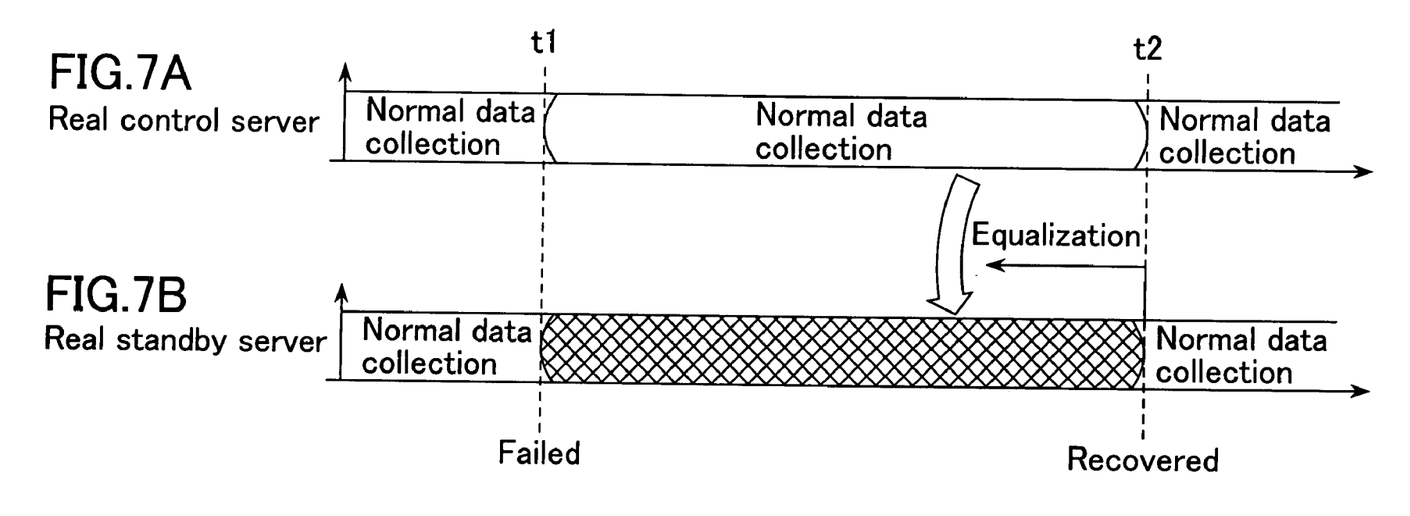
FIG. 7 is a time chart illustrating data equalization in the case of recovery of a real standby server from a failed state.

Equalization of data if the real standby server recovers from a failed state will be described using the time chart shown in FIG. 7. FIG. 7 (A) indicates the situation of data collection in the real control server, and (B) indicates the situation of data collection in the real standby server and also shows details in which a failure occurring in the standby server at instant t1 has recovered at instant t2.

In the control server, normal data collection is carried out even while the failure is occurring from instant t1 to instant t2 and the past data during this period of time are accumulated in the historical database by the HDA server. The standby server equalizes the data missed during the failed state period of time by obtaining those data from the historical database in the control server via the HDA interface at the instant t2 of recovery from the failed state.

Figure 8:
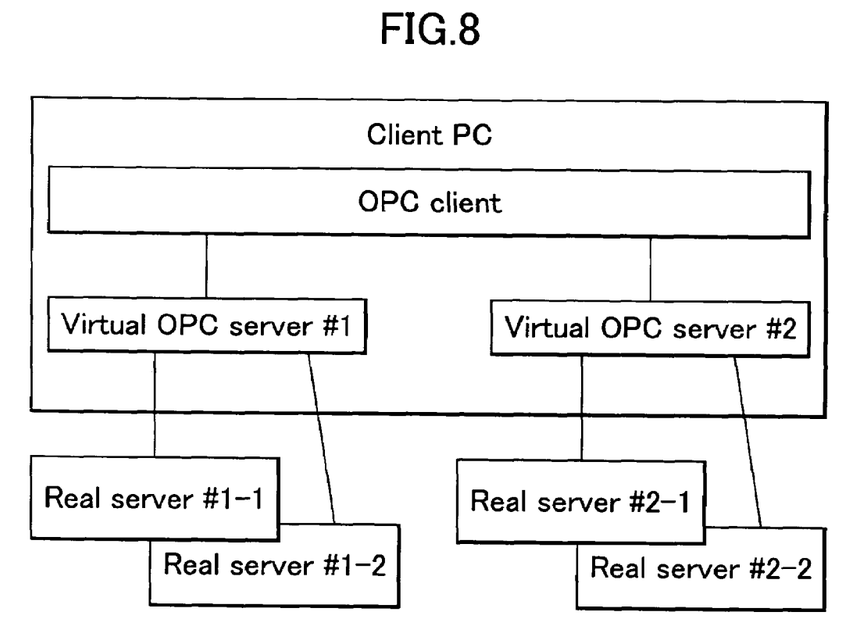
FIG. 8 is a functional block diagram indicating another embodiment of the present invention.

For the above-described embodiment, although a process data collection system where redundancy is performed using one virtual server and two real servers is described, it is also possible to adopt a configuration in which two virtual OPC servers are formed in one client PC and each of them communicates with two real servers respectively as shown in FIG. 8.

Figure 9:
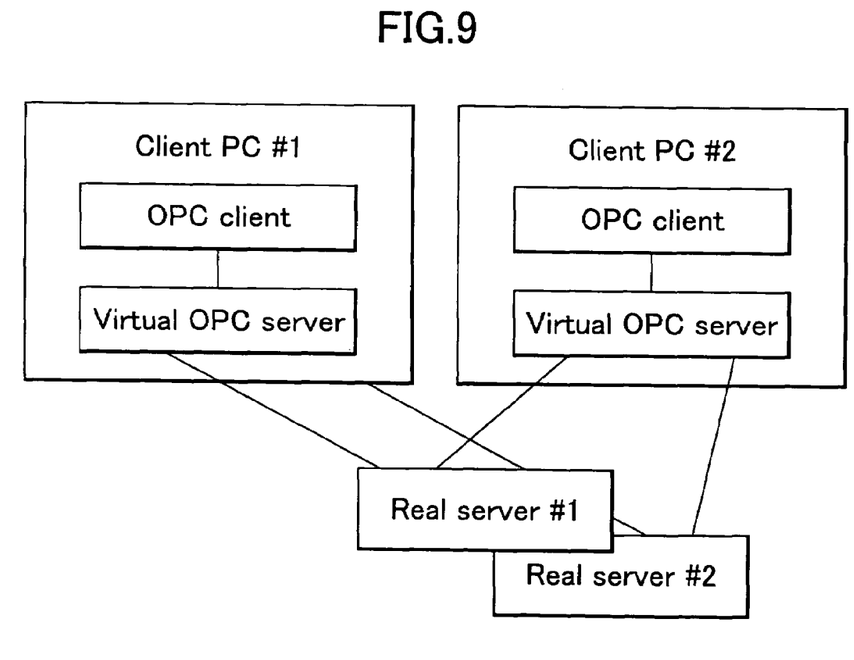
FIG. 9 is a functional block diagram indicating another embodiment of the present invention.

Further, as shown in FIG. 9, it is also possible to adopt a configuration in which virtual OPC servers formed in each of two client PCs respectively communicate with two real servers in common.

As apparent from the above description, the following effects are obtained according to the present invention:

(1) Generation of a communication load in the real standby server for collecting data that are not used usually is avoided by a monitoring means performing switch-over which enables the real control server to access process data through making the server active, and stops the real standby server from accessing process data by making this server inactive.

(2) Generation of a communication load for data items that do not require periodic updating among the data items requested by a client, is avoided by the mechanism in which data items specified for periodic collection among the registered data items are registered to the common database in the aforementioned virtual server as well as registered as a common group in two real servers and the data items registered as the common group are updated via the cache buffer means provided in each real server.

(3) Generation of process data missing due to hardware failure or software failure in the OPC client and shutdown of the OPC client function based on maintenance can be backed up by introducing the historical database managed by the HDA server which accumulates data in the DA server and A&E server into the real server. Data items registered to the control DA server are automatically registered to the control HDA server. Since the HDA server in the standby server is connected to the control DA server, data items registered to the control DA server are automatically registered to the standby HDA server.

(4) Continuity and equivalency of data can be maintained in an environment in which a communication load is reduced with the standby DA server always shut down through the fact that the virtual HDA server obtains data from the control DA server and accumulates them in the historical database.

(5) No A&E data is missed except for the case where two A&E servers fail at the same time because A&E servers are simultaneously made active in the real control server and the real standby server.

What is claimed is:

1. A process data collection system comprising:
two real servers accessible to process data in common;
a means for switching over said two real servers, one to a real control server and the other to a real standby server;
a virtual server which gives access data in said real control server to a client; and
a monitoring means outside the two real servers for performing switch-over which enables said real control server to access said process data by making said real control server active, and stops said real standby server from accessing said process data by making said real standby server inactive,
wherein data items collected by said client are grouped at every data collection period and registered to said virtual server and said two real servers;
data items specified for periodic collection are registered to a common database in said virtual server as well as registered in said two real servers as a common group;
data items registered as a common group in said two real servers are updated via a cache buffer provided in each of said real servers; and
said common database in said virtual server is updated with data in the cache buffer provided in said real control server as well as given to said client via a cache buffer provided in said virtual server.

2. A process data collection system comprising:
two real servers accessible to process data in common;
a means for switching over said two real servers, one to a real control server and the other to a real standby server;
a virtual server which gives access data in said real control server to a client; and
a monitoring means outside the two real servers for performing switch-over which enables said real control server to access said process data by making said real control server active, and stops said real standby server from accessing said process data by making said real standby server inactive,
wherein a DA server to access said process data and an A&E server to access alarm data and event data are provided in each of said two real servers; and
said A&E servers both in the control server and the standby server of said two real servers are made active and access alarm data and event data.

3. A process data collection system comprising:
two real servers accessible to process data in common;
a means for switching over said two real servers, one to a real control server and the other to a real standby server;
a virtual server which gives access data in said real control server to a client; and
a monitoring means outside the two real servers for performing switch-over which enables said real control server to access said process data by making said real control server active, and stops said real standby server from accessing said process data by making said real standby server inactive, wherein a DA server to access said process data and an A&E server to access alarm data and event data are provided in each of said two real servers;

HDA servers to receive data in said DA servers and data in said A&E servers as inputs and to accumulate those data in an historical database for a predetermined period of time are provided in said two real servers; and a switch-over detection means, which receives (operating) status information on said DA server, said A&E server, and said HDA server as inputs is provided in said virtual server, executes a switch-over command for control DA server and standby DA server in said two real servers and another switch-over command for connection of the I-IDA server in said real standby server to the DA server in said real control server.

4. A process data collection system comprising:

two real servers accessible to process data in common;

a means for switching over said two real servers, one to a real control server and the other to a real standby server;

a virtual server which gives access data in said real control server to a client; and a monitoring means outside the two real servers for performing switch-over which enables said real control server to access said process data by making said real control server active, and stops said real standby server from accessing said process data by making said real standby server inactive, wherein a DA server to access said process data and an A&E server to access alarm data and event data are provided in each of said two real servers;

HDA servers to receive data in said DA servers and data in said A&E servers as inputs and to accumulate those data in an historical database for a predetermined period of time are provided in said two real servers; and if said two real servers are normal, the HDA server in said real standby server obtains process data by accessing the DA server in said real control server and accumulates the process data in the historical database.

5. A process data collection system in accordance with claim 1, wherein said monitoring means monitors for abnormalities in at least said two real servers and when an abnormality occurs, the control server and the standby server of said two real servers are switched over.

6. A process data collection system in accordance with claim 2, wherein said monitoring means monitors for abnormalities in at least said two real servers and when an abnormality occurs, the control server and the standby server of said two real servers are switched over.

7. A process data collection system in accordance with claim 3, wherein said monitoring means monitors for abnormalities in at least said two real servers and when an abnormality occurs, the control server and the standby server of said two real servers are switched over.

8. A process data collection system in accordance with claim 4, wherein said monitoring means monitors for abnormalities in at least said two real servers and when an abnormality occurs, the control server and the standby server of said two real servers are switched over.

* * * * *